United States Patent
Matteucci

(10) Patent No.: US 8,276,641 B2
(45) Date of Patent: Oct. 2, 2012

(54) TIRE-CHANGING MACHINE FOR FITTING AND REMOVING VEHICLE WHEELS

(75) Inventor: Andrea Matteucci, Correggio (IT)

(73) Assignee: Sicam S.r.L., Correggio (RE) (IT)

( * ) Notice: Subject to any disclaimer, the term of this patent is extended or adjusted under 35 U.S.C. 154(b) by 351 days.

(21) Appl. No.: 12/588,865

(22) Filed: Oct. 30, 2009

(65) Prior Publication Data

US 2010/0108271 A1  May 6, 2010

(30) Foreign Application Priority Data

Oct. 31, 2008  (IT) .............................. MO2008A0278

(51) Int. Cl.
*B60C 25/135* (2006.01)

(52) U.S. Cl. ..................................................... 157/1.24

(58) Field of Classification Search ................. 157/1.17, 157/1.24, 14; 356/139.09, 155, 601, 602, 356/614, 623

See application file for complete search history.

(56) References Cited

U.S. PATENT DOCUMENTS

| | | | |
|---|---|---|---|
| 7,089,987 B2 * | 8/2006 | Gonzaga | 157/14 |
| 7,264,032 B2 * | 9/2007 | Peinelt et al. | 157/1.22 |
| 2003/0084977 A1 * | 5/2003 | Gonzaga | 152/381.5 |
| 2004/0165180 A1 | 8/2004 | Voeller et al. | |
| 2008/0123107 A1 | 5/2008 | Sotgiu | |
| 2008/0297777 A1 | 12/2008 | Sotgiu | |

FOREIGN PATENT DOCUMENTS

EP  1927484 A1 * 6/2008
EP  1995083 A1 * 11/2008

* cited by examiner

*Primary Examiner* — David B Thomas

(74) *Attorney, Agent, or Firm* — Stein McEwen, LLP

(57) ABSTRACT

The tire-changing machine for fitting and removing vehicle wheels comprises a base frame for supporting gripping and rotating means for a vehicle wheel with a rim and a tire to be fitted/removed, an operating head operatively associated with the base frame and having at least a fitting/removal tool, operating means or actuators suitable for positioning the operating head in a work configuration in which the tool is arranged in contact against the tire substantially near the flange of the rim. The actuators are responsive to a processing and control unit which positions the operating head in the work configuration, so that the fitting/removal tools can fit, and/or remove, a tire from the rim of a vehicle wheel.

12 Claims, 1 Drawing Sheet

TIRE-CHANGING MACHINE FOR FITTING AND REMOVING VEHICLE WHEELS

FIELD OF THE INVENTION

The present invention relates to a tire-changing machine for fitting and removing vehicle wheels.

BACKGROUND OF THE INVENTION

It is known that vehicle wheels are composed of a cylindrical metal rim having, at the axial extremities, annular flanges between which a channel for the slot-in fitting of an elastic tire is defined.

In fitting configuration, the side portions of the tire, the so-called "beads", are stopped up fast, or pressed against, the annular flanges of the rim.

Inside the tire, an inner tube can be fitted or, in the case of "tubeless" type tires, air under pressure can be introduced directly.

To perform the tire fitting and removal operations onto and from the relevant rims, so-called tire-changing machines are currently used which allow removing the tire from the relevant rim, e.g., to perform maintenance jobs or replace the inner tube, the rim and/or the tire itself, and then fit the same tire, or a replacement tire, back on the wheel rim.

Traditionally, tire-changing machines are composed of a base frame that supports gripping and rotating means for the wheel rim being worked upon.

The rotation axis of the gripping and rotating means can be vertical or horizontal according to the type of tire-changing machine.

One or more operating heads are mounted on the base frame, and include one or more tools for fitting and/or removing the tire onto and from the rim.

The tools used have different shapes and dimensions according to their intended use.

Some tools, for example, have a hook shape and are intended to be fitted between the beads of the tire and the corresponding annular flanges of the rim to detach them, during removal, and to press the beads inside the channel defined between the annular flanges, during fitting.

Other tools, on the other hand, have a truncated cone or cylindrical shape and are fitted revolving to act as pressing rollers intended to push the tire towards the inside of the rim channel during fitting, or towards the outside during removal.

The operating heads fitted on the tire-changing machine are operatively associated with automated operating means, such as pneumatic cylinders, hydraulic cylinders or the like, which perform the fitting and removal operation with greater force than a human being.

The operator operates the machine by means of the operating commands that control the movement of the operating heads, and the exact operation of the machine is obtained by means of the correct control of the tools.

Machines made this way, however, are susceptible to upgrading aimed at making them more practical to use and more precise in performing the fitting and removal operations.

With traditional machines in fact, the movement of the tools is inconveniently dependant on the professionalism and experience of the operator.

In particular, it must be noted that the most critical phases for the operator during the performance of the fitting and removal operations on a tire-changing machine are the following:

recognising the contact flange of the tire on the rim and the precise positioning of the tools close to it to perform the following operation phases;

the operation of the hook tools for removing the tire from the rim channel without causing excessive stress on the bead or breakages of its inner structure (above all in the case of more delicate tires such as low profile tires and runflat tires) and without touching and scratching the rim (above all in the case of prized rims such as alloy rims).

More in general therefore, it is underlined that the ability of the operator to recognise the flange of the rim on which the tire comes into contact and his/her skills in correctly positioning the tools near the flange itself represents a current functional limit of the tire-changing machines.

In this respect, furthermore, it is specified that the difficulty in controlling traditional tire-changing machines inconveniently results in their only being able to be used by skilled and suitably trained personnel at a significant cost.

BRIEF SUMMARY OF THE INVENTION

The main aim of the present invention is to provide a tire-changing machine for fitting and removing vehicle wheels that is practical and functional to use and makes it easier for the operator to perform the fitting and removal operations to the point of also being able to be used by non-skilled personnel, thus providing a considerable economic saving in terms of lower labor costs.

Another object of the present invention is to provide a tire-changing machine for fitting and removing vehicle wheels that overcomes the mentioned drawbacks of the background art in the ambit of a simple, rational, easy, effective to use and low cost solution.

The above objects are achieved by this tire-changing machine for fitting and removing vehicle wheels, comprising a base frame for supporting gripping and rotating means for at least one wheel of vehicles with a rim and a tire to be fitted/removed, at least an operating head associated with said base frame and having at least a fitting/removal tool, operating means for positioning said operating head in a work configuration in which said tool is arranged in contact against said tire substantially near the flange of said rim, wherein it comprises detection means without contact of said flange of the rim, which are operatively associated with at least one processing and control unit suitable for the control/aid of said operating means for the positioning of said operating head in said work configuration.

Other characteristics and advantages of the present invention will become more evident from the description of a preferred, but not sole, embodiment of a tire-changing machine for fitting and removing vehicle wheels, illustrated purely as an example but not limited to the annexed drawings.

DETAILED DESCRIPTION OF THE INVENTION

Figure 1:
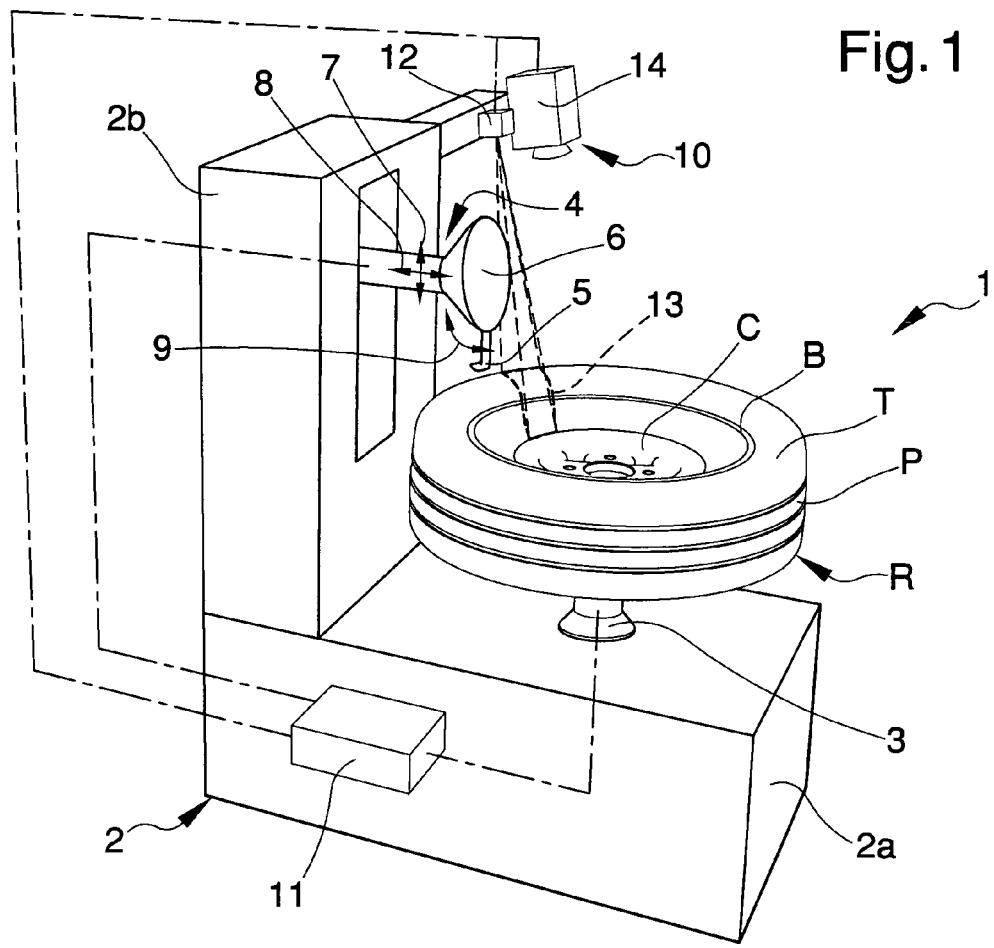
FIG. 1 is a perspective view of the machine according to the invention.

With particular reference to such figures, globally indicated by 1 is a tire-changing machine for fitting and removing vehicle wheels.

The machine 1 comprises a base frame 2 for supporting gripping and rotating means 3 of a wheel R for vehicles.

The wheel R is composed of an inner rim C and of a tire P to be fitted and/or removed onto/from the rim C.

In the particular embodiment of the invention shown in the illustrations, the base frame 2 comprises a base 2a above which the gripping and rotating means 3 extend.

The gripping and rotating means 3 are composed of a vertical-axis spindle, but alternative embodiments cannot be ruled out in which the machine 1 has horizontal-axis gripping and rotating means 3.

The base frame 2 also comprises a turret 2b that extends vertically from the base 2a and which supports an operating head 4.

The operating head 4 has a tool 5, 6 for fitting and/or removing the tire P and is operatively associated with operating means 7, 8, 9, of the automated type, suitable for positioning the operating head 4 in a work configuration in which the tool 5, 6 is arranged in contact against a bead T of the tire P substantially near, or adjacent to, the flange B of the rim C.

In the particular embodiment of the invention shown in the illustrations, the operating head 4 is defined by a substantially horizontal arm that protrudes overhanging from the turret 2b and which has a free extremity at which the tool 5, 6 is fitted.

The tool 5, 6, in particular, is defined by a hook-shaped tool 5, insertable longitudinally between the bead T of the tire P and the rim C of the wheel R to grip and extract the bead T, and by a push element 6 designed to be pressed against the bead T to push the wheel R during fitting and removal operations.

Usefully, the operating means 7, 8, 9 are schematically shown in FIG. 1 and comprise:
- a first actuator 7 for moving the operating head 4 along a direction parallel to the rotation axis of the wheel R and, in detail, along the turret 2b;
- a second actuator 8 for moving the operating head 4 along a direction at right angles to the rotation axis of the wheel R and, specifically, so as to extend and shorten the arm 4;
- a third actuator 9 for moving the operating head 4 to vary the angle of the tool 5 with respect to the rotation axis of the wheel R to ensure easier gripping and extraction of the bead T during removal operations.

Alternative embodiments are envisioned in which a plurality of operating heads 4 are fitted with tools 5, 6 different from those shown in the illustrations and which can be operated by different types of actuators 7, 8, 9. For example, embodiments are possible in which the tools 5, 6 are substantially fixed and the gripping and rotating means 3 are movable with respect to the tools 5, 6 in order to move the wheel R horizontally and/or vertically and or obliquely.

Advantageously, the machine 1 has non-contact detection means 10 intended to recognise the flange B of the rim C.

The non-contact detection means 10 are operatively associated with a processing and control unit 11 suitable for controlling and/or aiding the operating means 7, 8, 9 to position the operating head 4 in the work configuration.

In this respect, it must be pointed out that when we say the processing and control unit 11 is suitable for "controlling" the operating means 7, 8, 9, we mean that the movement of the operating head 4 during the fitting and/or removal operations is completely and independently performed by the machine 1 by means of the processing and control unit 11, without any direct intervention on the part of the operator.

When, on the other hand, we say that the processing and control unit 11 is suitable for "aiding" the operating means 7, 8, 9 we mean that the processing and control unit 11 helps the operator while he/she controls the operating means 7, 8, 9, e.g., by slowing down their movements near the flange B of the rim C or by defining a series of end-of-stroke positions for the actuators 7, 8, 9, inhibiting all the commands given by the operator that would move the operating head 4 against the rim C with the risk of damaging it.

Usefully, the non-contact detection means 10 comprise an identification system of the structured light type.

More in detail, the non-contact detection means 10 comprise a pattern generator 12 suitable for projecting towards the wheel R an image, in itself, known to the processing and control unit 11.

The pattern generator 12 is composed, e.g., of a laser diode with known angular opening which, advantageously, projects a three-dimensional image into space, which means it does not only propagate along a line or a single plane but also along a cone or a pyramid of light.

The projected image can, e.g., be a pattern of more, or fewer colored lines 13 which intercept the wheel R and highlight the profile.

To acquire the shape of this profile, the non-contact detection means 10 comprise a detection device 14 for detecting the light generated by reflection from the intersection of the projected image 13 with the wheel R.

The detection device 14, for example, is composed of an optical sensor, of the CCD (Charge-Couple Device) type or the like, which reproduces the shape of the lines 13 on the wheel R and transfers the data to the processing and control unit 11.

By means of an algorithm, or a series of algorithms, the processing and control unit 11 processes the acquired image 13 to obtain the parameters useful for recognising the flange C, and any other parts of the wheel R, for their positioning in space.

Figure 2:
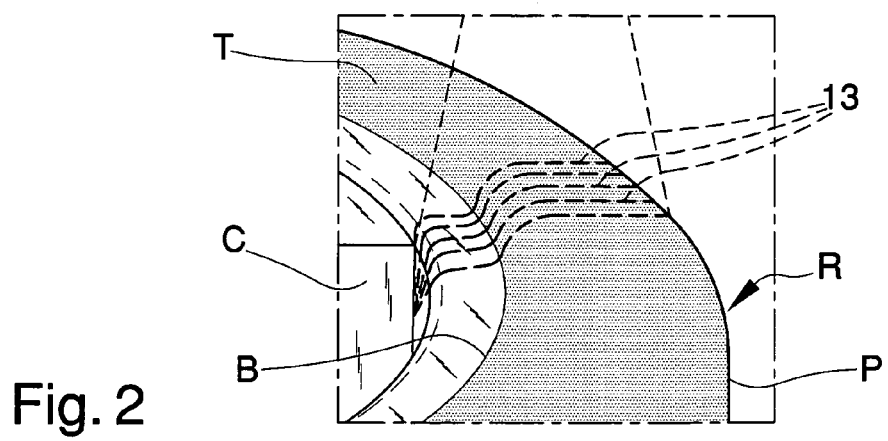
FIG. 2 is a perspective view, on an enlarged scale, of a possible image projected by the machine according to the invention on the wheel being processed.

Making reference to the FIG. 2 which reproduces in detail the image 13 reproduced on the wheel R, the relative distance between the lines 13 allows calculating the distance of the wheel R from the laser diode 12 and therefore locating the wheel R in the reference system of the machine 1.

The shape of the lines 13 (curvature, continuity, relative divergence) detected on the wheel R, on the other hand, is compared with the shape of the image originally projected by the laser diode 12 and recognizes the shape of the lit-up surface and identifies the flange B of the rim C, and other major points of the wheel R, useful for operating the operating head 4.

It must be pointed out, furthermore, that with the structured-light type identification system adopted on the machine 1 according to the invention, during the carrying out of the fitting/removal operations of the tire P onto/from the rim C, the movement of the operating head 4 and of the tool 5, 6 can be reproduced and their effectiveness can be determined on the wheel R, to allow a complete closed-circuit control of the automatic operation.

It is further underlined that different embodiments of the present invention are possible in which the acquisition of the shape of the wheel R is also achieved without projecting a specific pattern 13.

In other words, the non-contact detection means 10 can also consist of systems other than structured light systems, e.g., an identification system for identifying the colors of the rim C and of the tire P.

This system exploits the fact that the colour variation between rim C and tire P, produced by the two different materials, is sufficient to identify the flange B of the rim C.

For this purpose, a camera can be used identical to that previously described. However, instead of a laser diode, one or more isotropic illuminators can be used to place the system in controlled conditions (e.g., to overcome the objective limits of ambient light).

Alternatively, the non-contact detection means 10 can consist of a system of identification of the shadows defined on the rim C and on the tire P by means of the projection of light coming from two or more known points, and fixed inside the reference system of the machine 1.

It has in fact been ascertained how the described invention achieves the proposed objects.

In this respect, it is specified that the particular solution of envisaging detection means of the flange of the rim allows recognising the geometries and the topography of the wheel in a manner independent of the skill of the operator.

Other modifications or revisions to applicant's tire changing machine will occur to the skilled artisan in a related technical area. Consequently, the appended claims should be broadly construed in a manner consistent with applicant's contribution to the tire changing art and should not be limited to their literal terms.

What is claimed is:

1. Tire-changing machine for fitting and removing vehicle wheels, comprising:
   a) a base frame for supporting gripping and rotating means for a wheel of a vehicle with a rim and a tire to be fitted/removed;
   b) an operating head operatively associated with said base frame and having at least a fitting/removal tool;
   c) operating means for positioning said operating head in a work configuration in which said tool is arranged in contact with said tire substantially near the flange of said rim;
   d) non-contact detection means for detecting without contact the flange of the rim;
   e) said non-contact detection means being operatively associated with at least one processing and control unit suitable for the control/aid of said operating means;
   f) said non-contact detection means including an identification system of the structural light type;
   g) at least a pattern generator for projecting at least one three dimensional image toward said wheel; and
   h) at least one detection device for detecting the light generated by reflection by the intersection of said three dimensional image with said wheel.

2. The machine according to claim 1, wherein said pattern generator comprises at least a laser diode.

3. The machine according to claim 1, wherein said detection device comprises at least an optical sensor.

4. The machine according to claim 3, wherein said optical sensor is a CCD.

5. The machine according to claim 1, wherein said operating means are of the automated type.

6. The machine according to claim 1, wherein said operating means comprise at least a first actuator for moving said operating head in a direction substantially parallel to the rotation axis of said wheel.

7. The machine according to claim 1, wherein said operating means comprise at least a second actuator for moving said operating head in a direction substantially at right angles to the rotation axis of said wheel.

8. The machine according to claim 1, wherein said operating means comprise at least a third actuator for moving said operating head so as to vary the angle of said tool with respect to the rotation axis of said wheel.

9. The machine according to claim 1, wherein said processing and control unit independently controls the operation of said operating means.

10. The machine according to claim 1, wherein said processing and control unit for slows down the movements of said operating head near said flange of the rim.

11. The machine according to claim 1, wherein said processing and control unit is suitable for defining at least an end-of-stroke position for said operating means and for inhibiting the commands that would move said operating head against said rim.

12. The machine according to claim 1 wherein the movement of the operating head with said tool is reproduced by said identification system during the fitting/removal operations of the tire onto/from the rim.

* * * * *